US009038447B2

(12) United States Patent
Miller

(10) Patent No.: US 9,038,447 B2
(45) Date of Patent: May 26, 2015

(54) WIRELESS TIMING LIGHT

(71) Applicant: Service Solutions U.S. LLC, Warren, MI (US)

(72) Inventor: Joshua Miller, Portage, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 112 days.

(21) Appl. No.: 13/794,104

(22) Filed: Mar. 11, 2013

(65) Prior Publication Data

US 2014/0250991 A1 Sep. 11, 2014

(51) Int. Cl.
*G01M 15/02* (2006.01)
*F02P 17/06* (2006.01)

(52) U.S. Cl.
CPC ..................................... *F02P 17/06* (2013.01)

(58) Field of Classification Search
USPC ............... 73/114.58, 114.62, 114.63, 114.64, 73/114.65
See application file for complete search history.

(56) References Cited

U.S. PATENT DOCUMENTS

| | | | | |
|---|---|---|---|---|
| 4,063,539 | A | 12/1977 | Gorille et al. | |
| 4,095,170 | A | 6/1978 | Schmitt | |
| 4,174,697 | A | 11/1979 | Podrapsky et al. | |
| 4,423,624 | A * | 1/1984 | Dooley et al. | 73/114.65 |
| 4,489,690 | A | 12/1984 | Burkel et al. | |
| 4,517,833 | A * | 5/1985 | Wesley | 73/114.65 |
| 5,146,168 | A * | 9/1992 | Shaland | 324/392 |
| 5,610,327 | A * | 3/1997 | Becker et al. | 73/114.65 |
| 6,388,446 | B1 | 5/2002 | Nielsen et al. | |
| 2006/0113999 | A1 * | 6/2006 | Brothers et al. | 324/391 |

OTHER PUBLICATIONS

International Search Report PCT/US2014/022171; filed Mar. 8, 2014.

* cited by examiner

*Primary Examiner* — Eric S McCall
(74) *Attorney, Agent, or Firm* — Baker Hostetler LLP

(57) ABSTRACT

A system and method for adjusting the ignition timing of an engine. The system includes a strobe device in communication with a wireless clamp. The wireless clamp sends a firing signal of a spark plug of an engine to the strobe device and the strobe device synchronously strobes an LED with the signal. The user can use the strobe light to view markings on the engine in relation to an indicator to determine whether the ignition timing of the engine needs to be adjusted.

17 Claims, 3 Drawing Sheets

WIRELESS TIMING LIGHT

FIELD OF THE INVENTION

The present disclosure relates generally to diagnostic equipment. More particularly, the present disclosure relates to a timing light for adjusting the ignition timing of an internal combustion engine.

BACKGROUND OF THE INVENTION

Accurate ignition timing is crucial to achieve maximum fuel efficiency and performance of an internal combustion engine. Internal combustion engines are most commonly utilized in vehicles and portable machinery.

Typically, a piston moves up the cylinder and compresses the fuel mixture within the cylinder known as the Compression stroke. As the piston moves near or is at top dead center (TDC), the spark plug ignites the fuel mixture in the cylinder known as the Power stroke. The expansion from combustion forces the piston down in the cylinder transferring power to the drivetrain. Overtime, adjustment to the ignition timing is required due to replacement of timing belts/chains, spark plugs, distributor caps, and other ignition related components. This is part of a tune up that a vehicle technician will perform during servicing of the vehicle.

A timing light gun is often used to make adjustment to the initial ignition timing, check ignition timing advance curve, and determine rotations per minute (rpm) of the engine. As discussed further below, a light will flash from the timing light gun when the spark plug in cylinder one is fired during the Power stroke. Timing light guns only have certain adjustments that are included by the manufacturer and cannot be customized by the technician. Additionally, timing light guns store the diagnostic data locally and do not send the data to a remote location.

It is desirable to provide a method and system that includes a customizable wireless timing light for use by a technician and the ability to send diagnostic information remotely.

SUMMARY OF THE INVENTION

The foregoing needs are met, to a great extent, by the present invention, wherein in one aspect, a method and system is provided such that in some embodiments allow a vehicle technician to customize the functionality of the timing light and to send the diagnostic data remotely.

In accordance with one embodiment of the present disclosure, a timing light system that includes a strobe device having a strobe light on a surface of the strobe device, a memory that stores a diagnostic software, a wireless interface that communicates in at least one communication protocol, a processor in communication with the strobe light, the diagnostic software, and the wireless interface. The timing light system also includes a wireless clamping device configured to receive signals from a spark plug wire of an engine and send the signal to the wireless interface, wherein the processor uses the diagnostic software to synchronize the strobe light with the received signal.

In accordance with yet another embodiment of the present disclosure, a computer readable medium having contents that are configured to cause a computer system to perform a method that includes receiving, with a wireless interface, a signal from a firing of a spark plug in an engine of a vehicle, interpreting the signal with a processor of a strobe device, and strobing, controlled by the processor, a light on the strobe device so that the light is synchronous with the signal.

In accordance with still another embodiment of the present disclosure, a strobe device is provided and includes a strobe light on a surface of the strobe device, a memory that stores a diagnostic software, a wireless interface that communicates in at least one communication protocol and receives a wireless signal indicating a firing of a spark plug on an engine, and a processor in communication with the strobe light, the diagnostic software, and the wireless interface, wherein the processor uses the diagnostic software to synchronize the strobe light with the received signal.

There has thus been outlined, rather broadly, certain embodiments of the invention in order that the detailed description herein may be better understood, and in order that the present contribution to the art may be better appreciated. There are, of course, additional embodiments of the invention that will be described below and which will form the subject matter of the claims appended hereto.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

An embodiment of the present inventive method and system includes a customizable timing light device that can utilize certain devices already owned by the vehicle technician or garage. The method and system can further provide a timing light device that can send diagnostic data remotely to another computing device.

Figure 1:
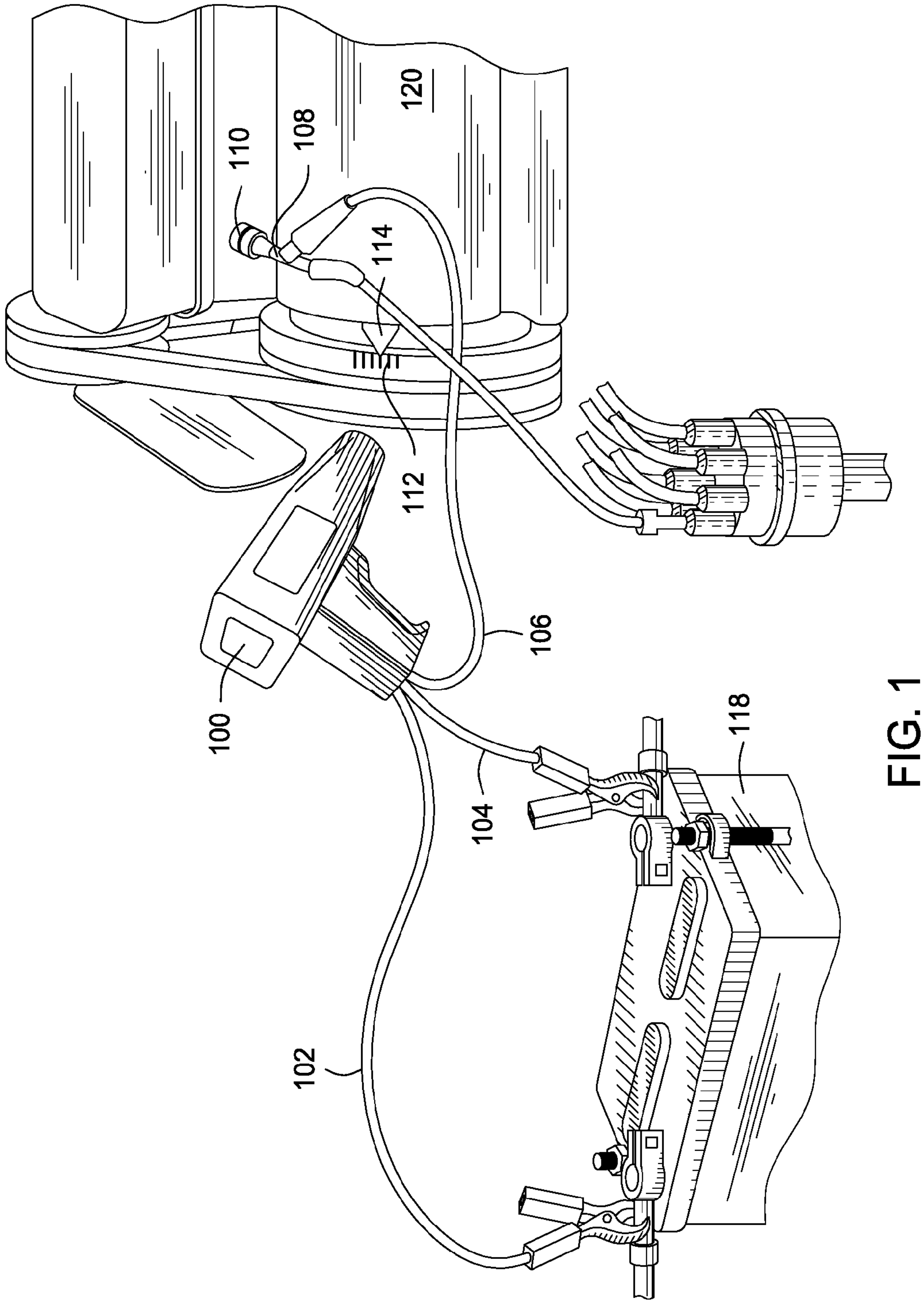
FIG. 1 Prior Art
FIG. 1 is a diagram illustrating a prior art timing light gun in use.

FIG. 1 is a diagram illustrating a prior art timing light gun 100 in use. At the beginning of a timing light test, the engine should be off and the ignition key is in the off position. The timing light gun 100 includes a red cable 102 having a clamp that clamps to the positive terminal of a battery 118 and a black cable 104 that clamps to a negative terminal of the battery 118. These connections allow the battery 118 to power the timing light gun 100 during use. The timing light gun 100 also includes a spark plug adapter cable 106 having an adapter 108, which attaches to a spark plug wire of the number 1 spark plug (of the first cylinder) 110 on the engine 120. The adapter 108 picks up the firing information or signal of the number 1 spark plug 110 and sends the signal back to the timing light gun 100, where the light is synchronously "strobe" with the detected firing.

The "strobe" light is directed, by a user, at timing markings 112 and indicator 114 on the engine 120. Based on the "strobe" light, the movement of the timing markings 112 in relation to the indicator 114, the vehicle technician can determine whether the timing is within the vehicle manufacture specifications.

Figure 2:
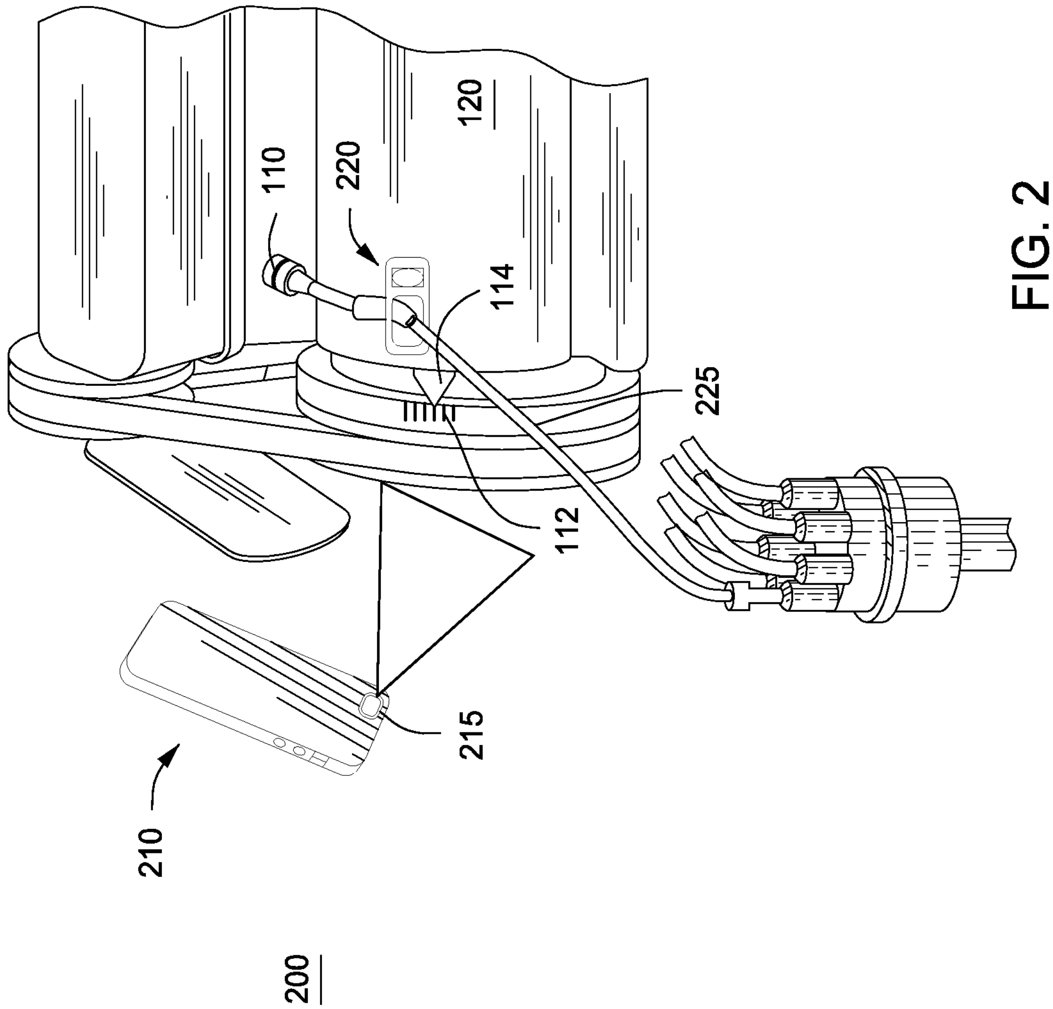
FIG. 2 is a diagram illustrating a timing light system in use according to an embodiment of the disclosure.

The disclosure will now be described with reference to the drawing figures, in which like reference numerals refer to like parts throughout. FIG. 2 is a diagram illustrating a timing light system 200 in use according to an embodiment of the disclosure.

The timing light system 200 includes a timing light device 210 and a wireless clamping device 220. The timing light device 210 can be any device, such as a smartphone or a diagnostic scan tool having a light such as an LED (light emitting diode) 215, OLED (organic light emitting diode), halogen, capable of being "strobe." Other timing light device 210 may include a computing device such as a tablet (e.g. IPad), an mp3 player (e.g. IPod), a general computing device, a personal digital assistant (PDA), a cellular phone, a tablet computer, a slate computer, or some combination of these or other devices that include lights, such as a camera, video camera, or smart flash. The timing light device 210 can communicate via a wired or wireless connection.

The wireless clamping device 220 is configured to be placed near or around a spark plug harness wire 225 in order to pick up the firing of the number 1 spark plug 110. The wireless clamping device 220 can wirelessly send the firing information or signal to the timing light device 210 or to another remote device (not shown). The wireless clamping device 220 can be configured to communicate via the Internet; intranet or extranet; Wi-Fi, ZigBee, Bluetooth, a local area network (LAN); a wide area network (WAN); a private network; a public network; an Ethernet-based system; a token ring; a value-added network; a telephony-based system, including, for example, T1 or E1 devices; an Asynchronous Transfer Mode (ATM) network; a wireless system; an optical system; a cellular system; a satellite system; near field communication, a combination thereof or the like.

In addition to or alternatively, the wireless clamping device 220 can send the firing information via a wired connection. The firing information can be used by the remote device (not shown) having a display that displays rotation per minute/tachometer of the engine, a shift indicator or as an injector signal. The firing information or signal can also be used to display similar information on a display 315 (FIG. 3) on the timing light device 210

Figure 3:
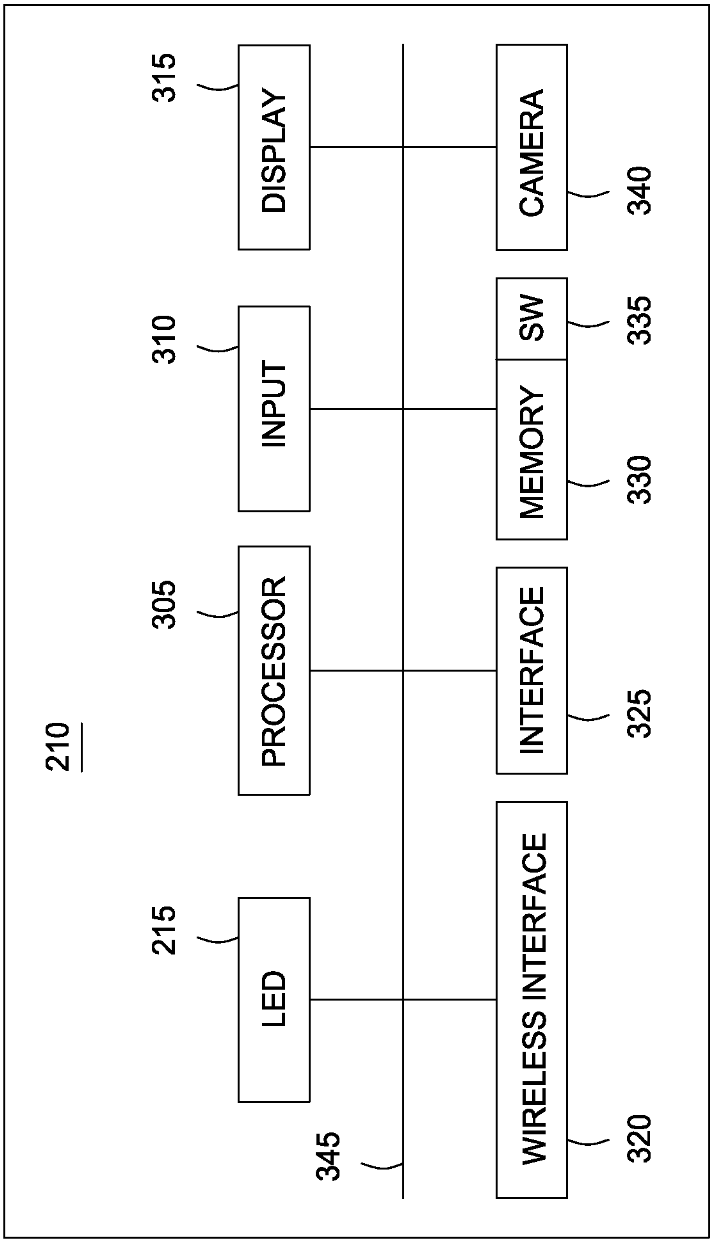
FIG. 3 is a block diagram of exemplary components of the timing light device according to an embodiment of the disclosure.

FIG. 3 is a block diagram of exemplary components of the timing light device 210 according to an embodiment of the disclosure. The timing light device 210 includes a processor or controller 305 along with a memory 330 having diagnostic software 335. The processor 305 may be an integrated circuit, a field programmable gate array (FPGA), a complex programmable logic device (CPLD), a programmable logic array (PLA), an application specific integrated circuit (ASIC), or a combination thereof The memory 330 can be volatile, nonvolatile, solid state, magnetic, optical, permanent, removable, writable, rewriteable, or read-only memory or the like.

The diagnostic software 335 can be configured to receive and interpret signals (wired or wireless) from the wireless clamping device 220. The signals can be from the firing of the number 1 spark plug 110. The diagnostic software 335 also controls the operation of the LED to synchronously "strobe" the LED with the firing of the number 1 spark plug 110 and any recording as described herein. The diagnostic software 335 can also send the diagnostic data or firing information and any recordings to a remote device (not shown) for further analysis or display.

The diagnostic software 335 also allows the user to conduct various timing tests including tests known in the art. The tests include 2 cycle or 4 cycle modes, measure centrifugal advance, measure vacuum advance, and advance timing test. The diagnostic software allows the user to set the initial timing, advance timing setting including the various degrees from TDC as desired by the user. Because the diagnostic software can be updated via the Internet or other sources, the timing light device 210 is configurable by the user. The user can simply purchase one type of test or a suite of tests thereby purchasing only what is needed.

An input 310 is provided and can include a mouse, stylus, keyboard (including virtual), with which the user may interactively input information using direct manipulation of a GUI to select from a variety of selectable fields, including selectable menus, web pages, drop-down menus, tabs, buttons, bullets, checkboxes, text boxes, and the like. The user may also directly enter the information using the input 310. Other input devices include a trackball, a scroll wheel, a touch screen or a voice-activated system.

In another embodiment, the timing light device 210 can include an optional camera 340 so that the "strobe" LED 215 along with the timing markings 112 and the indicator 114 on the engine 120 may be recorded. The recording can be done one frame at a time or multiple frames at a time as desired by the technician and can be stored locally (for later access) or sent to a remote device for further analysis. The analysis can be done remotely and sent back to the technician with instructions on how to adjust the timing, if needed. With the display 315, the remote analysis of the data can be viewed by the user. Additionally, the display can be used to communicate (e.g. video conferencing) with a remote technician who can guide the user to adjust the timing using the simultaneous feed from the camera 340. This allows real time guidance by a remote technician to the user.

In another embodiment, with the camera, the timing light device 210 using the diagnostic software 335 can analyze the movement of the timing markings 112 in relation to the indicator 114, and provide the adjustment information to the user accordingly. The diagnostic software 335 can include the timing specifications for various vehicles in a local database or access a remote database for the timing specifications. In an embodiment, the user can enter the vehicle information such as the VIN (vehicle identification number) or scan a bar code containing the vehicle information with the camera in order for the correct vehicle timing specification to be accessed by the timing light device 210. Thus, even a user with minimal experience can adjust the timing of his or her vehicle.

A wireless interface 320 can be used to communicate the diagnostic data to a remote location and to receive the analysis. Also, the wireless interface 320 allows communication with the remote technician who can provide additional assistance to the user. The wireless interface 320 can be configured to communicate via the Internet; intranet or extranet; Wi-Fi, ZigBee, Bluetooth, a local area network (LAN); a wide area network (WAN); a private network; a public network; an Ethernet-based system; a token ring; a value-added network; a telephony-based system, including, for example, T1 or E1 devices; an Asynchronous Transfer Mode (ATM) network; a wireless system; an optical system; a cellular system; a satellite system; near field communication, a combination thereof or the like.

In addition to the wireless interface 320, the timing light device 210 also includes an interface 325, such as a connector or port for an OBD (On Board Diagnostic), Ethernet, USB, RS 232, FireWire, serial, parallel, or other types of physical connection. The interface 325 also can provide the connections to the vehicle battery to power the timing light device 210, if needed. However, the timing light device 210 may also be powered by an internal battery (not shown) or plug into an electrical socket (not shown).

A bus 345 may be used to connect the various components of the timing light device 210. The bus may be a conduit for signals to and from the various components or can also provide any power needed for the various components to operate.

In operation, with the engine off and the ignition switch in the off position, the wireless clamping device can be placed on or near the spark plug harness wire 225. Start the engine to let it warm up to normal operating temperature. After the engine is warm, the user can aim the LED 215 of the timing light device 210 at timing markings 112 and the indicator 114. The user can then activate the LED 215 on the timing light device 210 and observe the location of the timing markings 112 in relation to the indicator 114 and adjust the timing, if necessary. As stated above, the timing light device 210 or a remote technician can provide the user with instructions on how to adjust the timing, if needed.

What is claimed is:

1. A timing light system, comprising:

a strobe device including:

a strobe light on a s face of the strobe device;

a memory that stores diagnostic software;

a wireless interface that communicates in at least one communication protocol;

a processor in communication with the strobe light, the diagnostic software, and the wireless interface;

a camera to record, while an engine is operating, markings on an engine in relation to an indicator on the engine; and a wireless clamping device configured to receive signals from a spark plug of the engine and send the signal to the wireless interface, wherein the processor uses the diagnostic software to synchronize the strobe light with the received signal.

2. The system of claim 1, wherein the wireless clamping device sends the signal to a remote device to display interpretations of the signal.

3. The system of claim 1, wherein based on the recording, the diagnostic software provides a user with information to adjust a timing on the engine.

4. The system of claim 1, wherein strobe device is a smartphone or a cellular phone.

5. The system of claim 1, wherein the wireless interface sends in real time the recording to a remote technician and receives timing adjustment instructions from the remote technician for display on a display of the strobe device.

6. The system of claim 1, wherein the wireless interface sends the recording to a remote device for interpretation by a remote technician.

7. The system of claim 6, wherein the remote technician sends instructions to a user to adjust a timing of the engine.

8. A computer readable medium having contents that are configured to cause a computer system to perform a method comprising:

receiving, with a wireless interface, a signal from a firing of a spark plug in an engine of a vehicle;

interpreting the signal with a processor of a strobe device;

strobing, controlled by the processor, a light on the strobe device so that the light is synchronous with the signal; and recording, with a camera while the engine is operating, markings on the engine in relation to an indicator on the engine.

9. The computer readable medium of claim 8 further comprising:

interpreting the markings in relation to the indicator; and providing a user with instructions to adjust a timing of the engine.

10. The computer readable medium of claim 8 further comprising:

sending the recording to a remote device with the wireless interface; and receiving instructions from the remote device with the wireless interface.

11. The computer readable medium of claim 10 further comprising:

displaying on a display to a user the instructions from the remote device.

12. The computer readable medium of claim 8 further comprising:

sending the signal to a display on a remote device.

13. The computer readable medium of claim 12 further comprising:

interpreting the signal to display rotation per minute or shift indicator.

14. A strobe device, comprising:

a strobe light on a surface of the strobe device;

a memory that stores diagnostic software;

a wireless interface that communicates in at least one communication protocol and receives a wireless signal indicating a firing of a spark plug on an engine;

a camera to record, while the engine is operating, markings on the engine in relation to an indicator on the engine; and a processor in communication with the strobe light, the diagnostic software, the camera and the wireless interface, wherein the processor uses the diagnostic software to synchronize the strobe light with the received signal.

15. The device of claim 14, wherein based on the recording, the diagnostic software provides a user with information to adjust a timing on the engine.

16. The device of claim 14, wherein the wireless interface sends the recording to a remote device for interpretation by a remote technician.

17. The device of claim 16, wherein the remote technician sends instructions to a user to adjust a timing of the engine.

* * * * *